Nov. 15, 1960  G. D. HUNTER  2,960,346
FARM IMPLEMENT
Filed Nov. 27, 1957  2 Sheets-Sheet 1

INVENTOR.
GEORGE D. HUNTER
BY
C. T. Parker and W. A. Murray
ATTORNEYS

Nov. 15, 1960
G. D. HUNTER
2,960,346
FARM IMPLEMENT
Filed Nov. 27, 1957
2 Sheets-Sheet 2
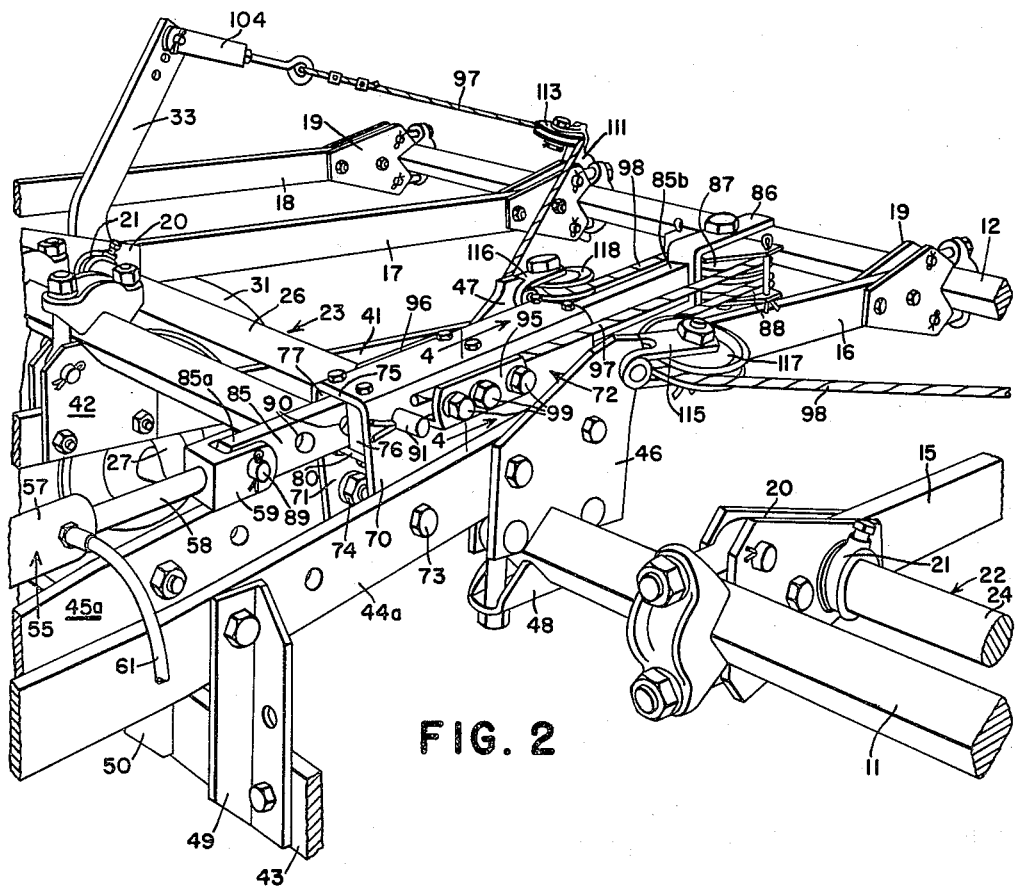
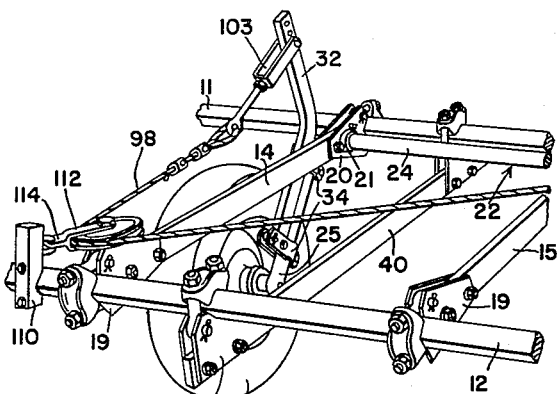
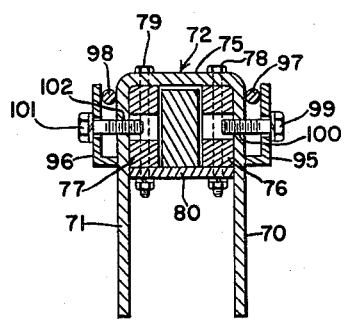
INVENTOR.
GEORGE D. HUNTER
ATTORNEYS United States Patent Office 2,960,346
Patented Nov. 15, 1960

2,960,346

FARM IMPLEMENT

George D. Hunter, Des Moines, Iowa, assignor, by mesne assignments, to Deere & Company, a corporation of Delaware Filed Nov. 27, 1957, Ser. No. 699,275

7 Claims. (Cl. 280—43.19)

This invention relates to a ground working type of farm implement and particularly to that type of implement in which the ground wheels are adjusted vertically relative to the main frame of the implement so as to adjust the ground working depth of the implement tools.

The implement herein to be described pertains generally to a tractor drawn type of implement featuring a laterally disposed and rigid main frame having a forwardly extending and rigidly connecting drawbar portion which is connectible to the rear of a tractor or other type of draft vehicle. The laterally disposed frame is supported on a pair of wheels which are connected to the main frame by means of crank axles which are rockable to adjust the wheels vertically relative to the main frame to effect the vertical position of the frame relative to the ground.

In the above described type of implement there is normally provided a hydraulic cylinder which is operated from the hydraulic system of the tractor for raising or lowering the wheels. It has been found that due to the short stroke of the average hydraulic cylinder provided with a tractor, that a direct connection to the crank axles is not feasible in many instances and consequently the normal power means between the hydraulic cylinder and the crank axle has resulted in rather a complicated and somewhat expensive type of linkage. Also, since the cylinder is normally anchored to the main frame, the ram or piston extends rearwardly from the cylinder, and since the crank arms of the crank axle normally extend rearwardly from the frame to carry the ground wheels, a direct connection to the crank axles will result in the implement or main frame being lowered on the power stroke of the hydraulic unit and raised on the non-power stroke or the stroke in which the hydraulic fluid flows into the ram end of the cylinder. This is an undesirable condition inasmuch as the desired time to use the power stroke is when the wheels are operating to raise the implement frame.

It is therefore the primary purpose of the present invention to provide a power lift system on the implement which utilizes a simple cable connection between the hydraulic power unit and the crank axles.

It is a further object of the invention to incorporate in the cable type connection suitable pulleys which operate to cause the wheels to lift the implement upon the power stroke of the cylinder and to lower the implement upon the return stroke of the hydraulic unit.

It is still a further object of the present invention to incorporate in the above type of cable lift a lock which will hold the crank axles in a relatively fixed position at any of a plurality of positions, thereby permitting the hydraulic cylinder to be either disconnected or to permit the load to be removed from the cylinder once the desired location of the frame relative to the ground has been reached.

Other objects and advantages of the present invention will become apparent to those skilled in the art as the nature of the invention is better understood from the following detailed description as illustrated in the accompanying drawings.

Fig. 2 is a front side perspective view of a portion of the implement.

Fig. 3 is a front side perspective view of one end portion of the implement.

Fig. 4 is a sectional view taken substantially along the line 4—4 of Fig. 2.

Figure 1:
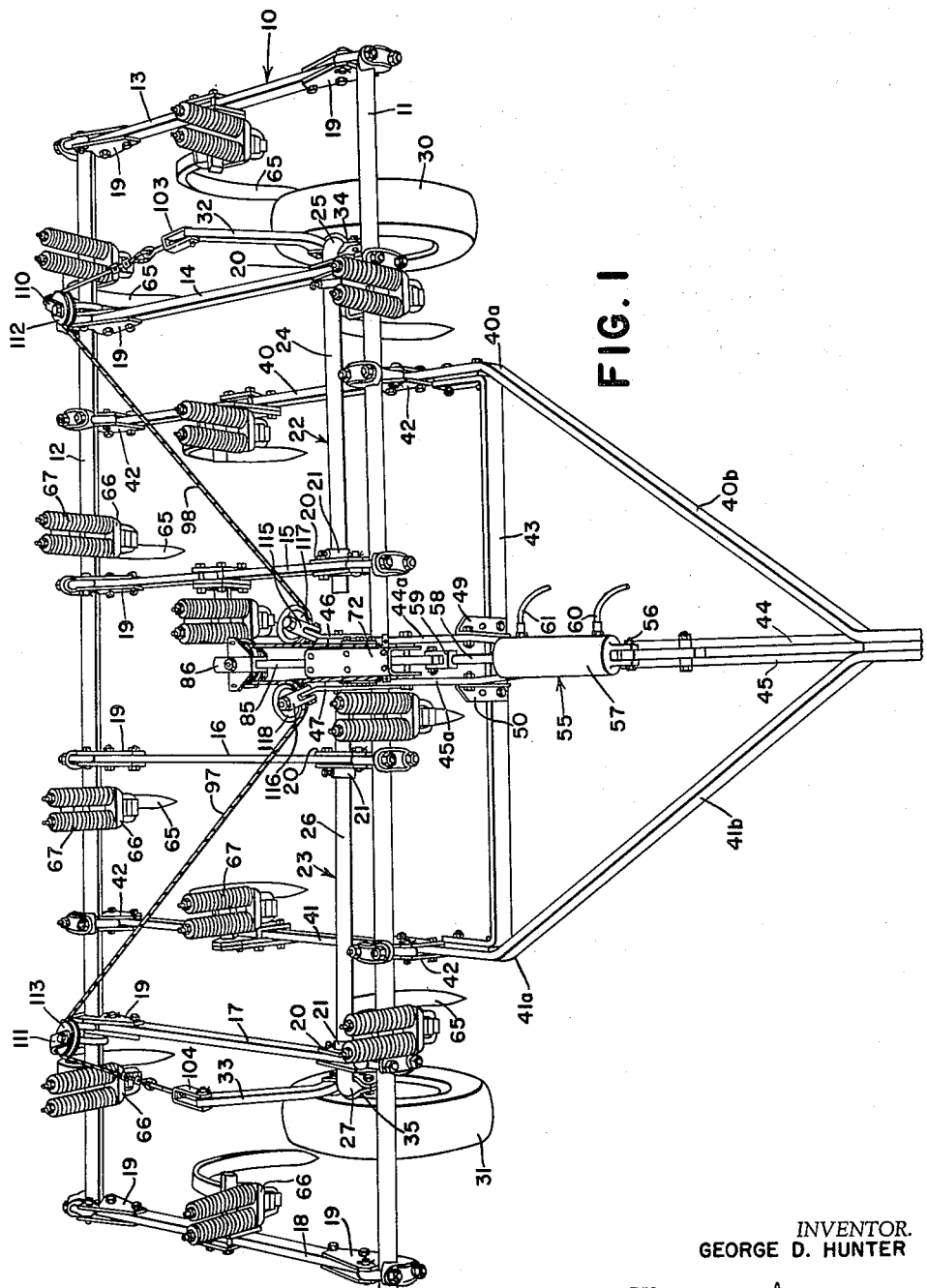
Fig. 1 is a front perspective plan view of the implement.

The main frame, indicated in its entirety by the reference numeral 10 is composed of a forwardly transverse structural member or tool bar 11 and a rear transverse structural member or tool bar 12, the front and rear tool bars being interconnected by fore-and-aft extending structural members numbered from left to right 13, 14, 15, 16, 17, and 18. Left and right, as is conventional and for purpose of this specification, will be determined by viewing the implement from its rear. Suitable clamps, as at 19, connect the fore-and-aft structural members 13–18 at their rear ends to the rear tool bar 12 and the forward ends of structural members 13 and 18 to the front tool bar 11. Modified type clamps 20 are at the forward ends of the fore-and-aft extending structural members 14, 15, 16, and 17 and operate not only to connect the respective forward ends to the front tool bar 11, but also provide journals, as at 21, supporting left and right crank axles 22, 23 respectively. Inasmuch as all of the brackets 19 are identical and the brackets 20 are identical, the similar brackets are given identical reference numbers. The left crank axle 22 includes a transverse horizontal portion 24 and a depending arm or portion 25. Similarly the right crank axle 23 is composed of a transverse horizontal portion 26 and a depending arm or portion 27. Mounted on the lower end of the arms 25, 27 are a pair of wheels 30, 31 respectively. Clamped to the depending arm portions 25, 27 are upwardly extending arms or members 32, 33 respectively which extend upwardly from the main or lateral portion of the frame. The lever members or arms 32, 33 are fixed to the depending arms 25, 27 by clamps 34, 35 respectively. As may be apparent from viewing the drawings, rocking of the crank members 22, 23 will cause the entire wheel means, comprising the wheels 30, 31 and the associated crank members 22, 23 to raise or lower the main frame 10.

The implement frame 10 is further characterized by a pair of fore-and-aft extending structural members 40, 41 positioned below the transverse tool bars 11, 12 and rigidly connected thereto by depending clamps, as indicated at 42. The clamps 42 are identical and consequently are given identical reference numbers throughout. The rigid members 40, 41 operate as drawbars and are turned inwardly at 40a and 41a, and converge forwardly at 40b, 41b and are bolted or otherwise united at their forward end. The forward end is provided with a clevis type connection, not shown, which is connectible to the tractor drawbar. A cross brace 43 connects the drawbars 40, 41 at a position adjacent their turned portions 40a, 41a. A pair of fore-and-aft extending central structural members 44, 45 extend rearwardly from the forwardly converged portions of the drawbar members 40, 41 and are connected at their rear ends to brackets 46, 47 which are clamped, as at 48, to the front tool bar 11. The members 44, 45 are further supported from the cross brace 43 by means of angle iron straps 49, 50. A hydraulic unit 55 is mounted on the fore-and-aft extending members 44, 45 by means of a bolt and nut combination 56 which anchors the cylinder 57 to the members 44, 45. A reciprocating ram 58 projects rearwardly from the cylinder 57 and is provided with a clevis 59 at its rear end. Hydraulic hoses 60, 61 serve to supply fluid to opposite ends of the cylinder.

As shown in Fig. 1, the tool bars 11, 12 carry cultivator shovels 65. Also, midway between the tool bars 11 and 12, the fore-and-aft extending connecting members 13, 15, and 18, and the fore-and-aft extending drawbar members 40, 41 carry cultivator shovels. The cultivator shovels 65 are mounted on the main frame 10 by suitable clamps 66 which incorporate the use of a cushioning or spring means 67. It should here be noted that while the implement as shown as a cultivator, it should be recognized that the cultivator shovels are shown for illustrative purposes only and other types of tools may be used. The type of tools is unimportant for purpose of this invention.

As of this point in the description, the cultivator or implement, other than the upwardly extending lever arms 32, 33 is substantially conventional, such being available in many commercial models now on sale. It is desired here to emphasize the new and novel method of adjusting the ground wheels 30, 31 in order to raise or lower the main frame. The mechanism for adjusting the position of the wheels relative to the frame, presently to be described, is the main feature of the present invention.

The fore-and-aft extending strap members 44, 45 are formed to flare outwardly at their rear portions, as at 44a and 45a, so as to provide a support for the opposite side or leg portions 70, 71 of an inverted U-shaped channel member 72. The channel member 72 is bolted, as at 73, 74 to the rigid members 44a, 45a. The channel member 72 is further characterized by having a transverse or bight portion 75 which interconnects the upper ends of the leg portions 70, 71 (Fig. 4). Supported in depending relation from the bight portion 75 are a pair of fore-and-aft extending guide members 76, 77, the support existing in vertical bolt and nut combinations 78, 79 respectively and a lower crossplate 80. As will later become apparent the inner sides of the guide members 76, 77 serve as guide surfaces for a sliding or reciprocating member 85.

The pulley carrying elongated and reciprocating member 85 is positioned between the guide bars 76, 77 and also between the bight portion 75 of the channel member 72 and the plate 80. The fit between the aforementioned parts is relatively loose, as shown in Fig. 4, so as to permit fore-and-aft movement of the member 85. The reciprocating member 85 has front and rear ends 85a and 85b respectively. The rear end 85b has rigidly affixed thereto a bifurcated member 86 which serves as a support for upper and lower axially alined cable pulleys 87, 88 respectively. The forward end 85a of the reciprocating member 85 is connected to the clevis 59 by means of a pin 89. Also provided in the reciprocating member 85 are a plurality of fore-and-aft spaced apart holes 90, only two of which are shown in Fig. 2, which are registrable with holes or apertures extending through the side plates 70, 71 and in the guide members 76, 77, all of which, when in register may receive a pin 91 for purposes of locking the reciprocating member 85 against movement.

On opposite sides of the inverted U-shaped channel member 72 are a pair of cable clamps 95, 96 which serve to clamp or anchor opposite ends of cables 97, 98 to the side plates 70, 71 respectively of the channel member 72. As will become apparent, the cables 97, 98 serve as means connecting the rigid elements or arms 32, 33 to the reciprocating member 85. The clamps 95, 96 are tightened against the cables 97 and 98 by means of a series of three bolts, such as at 99, which are received in tapped bores, such as at 100, in the side plate 70 and bolts 101 which are received in a tapped bore 102 in the side plate 71. The other or opposite ends of the cables 97 and 98 are anchored or connected to the lever arms 32, 33 by means of connecting links 103, 104.

Mounted on the rear tool bar 12 adjacent the fore-and-aft extending structural members 14 and 17 respectively are a pair of pulley brackets 110, 111 supporting cable pulleys 112 and 113 respectively through suitable articulate connecting means, such as at 114 in Fig. 3, the similar means relative to bracket 110 and pulley 112 not being clear in the drawings. Additional bifurcated pulley brackets 115, 116 are pivotally mounted on plate brackets 46, 47. The bifurcated portions of the brackets 115, 116 extend on opposite sides of cable pulleys 117, 118.

Following the line of extension of the cable 97 from its anchoring point adjacent the clamp 95, the cable extends around the upper pulley 87 forwardly to be threaded around the reverse pulley 118, rearwardly to the pulley 113 from where it extends forwardly to the link 104. Similarly the cable 98 extends from its anchored end adjacent the cable clamp 96 rearwardly to the lower pulley 88 and then forwardly to the reverse pulley 117 where it extends diagonally rearwardly to the rear cable pulley 112 and then forwardly to the link 103.

In operation, the power lift means of the farm implement operates in the following manner. The hydraulic unit 55 is anchored to the fore-and-aft extending rigid members 44, 45 in a manner whereby the ram portion 58 reciprocates in a fore-and-aft direction, and will cause the pulley carrying reciprocating member 85 to move fore-and-aft through the guide structure. Rearward or forward movement of the pulleys 87, 88 will activate movement of the cables 97, 98 to move the upwardly projecting rigid lever arms or elements 32, 33 so as to raise or lower the wheels 30, 31. By the relative position of the pulleys 112, 115 and 113, 116 being located in the manner described, the power stroke of the hydraulic unit, i.e. when fluid is forced into the cylinder end of the hydraulic unit, will cause the wheels 30, 31 to move downwardly relative to the main frame 10 and consequently the power stroke of the hydraulic unit operates to raise the implement relative to the ground. It should also be noted by use of the hydraulic power and cable mechanism, the entire lift mechanism is positioned above the main frame 10 and clear of the shovels 65 and out of position to contact material adjacent the ground.

While only one form of the invention has been shown, it should be recognized that other forms and variations will be suggested to those skilled in the art. It should therefore be understood that the description of the invention was here presented in detailed manner for purposes and clearly and concisely illustrating the principles of the invention and there was no intent to limit or narrow the invention beyond the broad nature set forth in the appended claims.

What is claimed is:

1. On a farm implement having a laterally disposed tool carrying main frame, transversely spaced wheel means including wheel-supporting arms, each having one end fulcrumed to the main frame, ground wheels on the opposite ends of the arms operative with the arms to raise or lower the main frame in response to rocking movement of the arms, and a movable power member having a power stroke in one direction and a return stroke in the opposite direction, the improvement residing in: a rigid guide fixed to the main frame; an elongated pulley-carrying member supported by the guide for fore-and-aft movement lengthwise of the member and having opposite ends outward of the guide; a plurality of axially alined pulleys supported on one end of the member; a plurality of rigid elements projecting upwardly above the main frame connected to the wheel means and operative upon movement to rock the wheel-supporting arms; a plurality of cables, each having one end anchored to the main frame and the opposite end connected to one of the upwardly projecting rigid elements above the main frame, and each of the cables being threaded over one of the pulleys on the pulley-carrying member; means connecting the opposite end of the pulley-carrying member to the movable power member; and pulley means positioned on the main frame to cause the cables to operate to raise the main frame upon the power stroke of the movable power member and to lower the main frame upon the return stroke of the movable power member.

2. On a farm implement having a laterally disposed tool carrying main frame, transversely spaced wheel means including wheel-supporting arms, each having one end fulcrumed to the main frame, ground wheels on the opposite ends of the arms operative with the arms to raise or lower the main frame in response to rocking movement of the arms, and a movable power member having a power stroke in one direction and a return stroke in the opposite direction, the improvement residing in: a rigid guide fixed to the main frame; an elongated member supported by the guide for fore-and-aft movement lengthwise of the member and having fore-and-aft spaced opposite ends outward of the guide; cable engaging means on one end of the member; a plurality of rigid elements projecting upwardly above the main frame connected to the wheel means and operative upon movement to rock the wheel-supporting arms; a plurality of cables, each having one end anchored to the main frame and the opposite end connected to one of the upwardly projecting rigid elements above the main frame, and each of the cables forming a bight on the cable engaging means on the elongated member whereby movement of the cables will be effected at a ratio of at least two to one upon fore-and-aft movement of the member; means connecting the opposite end of the elongated member to the movable power member; and pulley means positioned on the main frame to cause the cables to operate to raise the main frame upon the power stroke of the movable power member and to lower the main frame upon the return stroke of the movable power member.

3. On a farm implement having a laterally disposed tool carrying main frame, transversely spaced wheel means including wheel-supporting arms, each having one end fulcrumed to the main frame, ground wheels on the opposite ends of the arms operative with the arms to raise or lower the main frame in response to rocking movement of the arms, and a movable power member having a power stroke in one direction and a return stroke in the opposite direction, the improvement residing in: a rigid guide fixed to the main frame; an elongated member supported by the guide for reciprocating fore-and-aft movement and having opposite ends outward of the guide; a plurality of rigid elements projecting upwardly above the main frame connected to the wheel means and operative upon movement to rock the wheel-supporting arm; a plurality of flexible elements, each having one end anchored to the main frame and the opposite end connected to one of the upwardly projecting rigid elements above the main frame; means on one end of the reciprocating member effecting a bight portion in the flexible elements to effect movement of the flexible elements in response to movement of the elongated member at a ratio of at least two to one; means connecting the opposite end of the elongated member to the movable power member; and means positioned on the main frame to cause the flexible elements to operate to raise the main frame upon the power stroke of the movable power member and to lower the main frame upon the return stroke of the movable power member.

4. On a farm implement having a laterally disposed tool carrying main frame, transversely spaced wheel means including wheel-supporting arms, each having one end fulcrumed to the main frame, ground wheels on the opposite ends of the arms operative with the arms to raise or lower the main frame in response to rocking movement of the arms, and a hydraulic unit having its power stroke in the rearward direction and its return stroke in forward direction, the improvement residing in: a rigid guide fixed to and above the main frame; an elongated member supported by the guide for reciprocating fore-and-aft movement and having front and rear ends outward of the guide; a plurality of rigid elements projecting upwardly above the main frame connected to the wheel means and operative upon movement to rock the wheel-supporting arm; a plurality of flexible elements, each having one end anchored to the main frame and the opposite end connected to one of the upwardly projecting rigid elements above the main frame; said elements being disposed above the main frame; means on the rear end of the reciprocating member effecting a bight in the flexible element and for effecting movement of the flexible elements in response to movement of the elongated member in the ratio of at least two to one; means connecting the forward end of the elongated member to the hydraulic unit for effecting fore-and-aft movement of the member in response to the return and power stroke respectively of the hydraulic unit; and means positioned on the main frame to cause the flexible elements to operate to raise the main frame upon rearward movement of the reciprocating member and to lower the main frame upon forward movement of the member.

5. On a farm implement having a laterally disposed tool carrying main frame, wheel means including a wheel-supporting arm having one end fulcrummed to the main frame, a ground wheel on the opposite end of the arm operative with the arm to raise or lower the main frame in response to rocking movement of the arm, and a hydraulic power unit anchored to the main frame having power stroke in a rear direction and a return stroke in a forward direction, the improvement residing in: a rigid guide fixed to the main frame; and elongated pulley-carrying member supported by the guide for reciprocating fore-and-aft movement lengthwise of the member and having front and rear ends outward of the guide; a pulley supported on the rear end of the member; a rigid element projecting upwardly above the main frame connected to the wheel means and operative upon movement to rock the wheel-supporting arm; a cable having one end anchored to the main frame and the opposite end connected to the upwardly projecting rigid element, and threaded over the pulley on the pulley-carrying member whereby movement of the latter member will effect at least a two to one ratio of movement of the element; means connecting the front end of the pulley-carrying member to the hydraulic power unit for effecting fore-and-aft movement of the member in response to the return and power stroke respectively of the hydraulic unit; and pulley means positioned on the main frame to cause the cable to operate to raise the main frame upon rearward movement of the reciprocating member and to lower the main frame upon forward movement of the member.

6. On a farm implement having a laterally disposed tool carrying main frame, wheel means including a wheel-supporting arm having one end fulcrummed to the main frame, a ground wheel on the opposite end of the arm operative with the arm to raise or lower the main frame in response to rocking movement of the arm, and a hydraulic power unit anchored to the main frame, the improvement residing in: a rigid guide fixed to the main frame; an elongated pulley-carrying member supported by the guide for reciprocating fore-and-aft movement lengthwise of the member and having opposite ends outwardly of the guide; a pulley supported on one end of the member; a rigid element projecting upwardly above the main frame connected to the wheel means and operative upon movement to rock the wheel-supporting arm; a cable having one end anchored to the main frame and the opposite end connected to the upwardly projecting rigid element, and threaded over the pulley on the pulley-carrying member whereby movement of the latter member will effect at least a two to one ratio of movement of the rigid element; means connecting the opposite end of the pulley-carrying member to the hydraulic power unit for effecting fore-and-aft movement of the reciprocating member in response to adjustment of the hydraulic unit; and pulley means positioned on the main frame to cause the cable to operate to raise or lower the main frame upon movement of the reciprocating member.

7. On a farm implement having a laterally disposed tool carrying main frame, wheel means including a wheel-supporting arm having one end fulcrummed to the main frame, a ground wheel on the opposite end of the arm operative with the arm to raise or lower the main frame in response to rocking movement of the arm, and a hydraulic power unit anchored to the main frame, the improvement residing in: a rigid guide fixed to the main frame; an elongated pulley-carrying member supported by the guide for reciprocating movement lengthwise of the member and having opposite ends outwardly of the guide; a pulley supported on one end of the member; a rigid element projecting upwardly above the main frame connected to the wheel means and operative upon movement to rock the wheel-supporting arm; a cable having one end anchored to the main frame and the opposite end connected to the upwardly projecting rigid element, and threaded over the pulley on the pulley-carrying member whereby movement of the latter member will effect at least a two to one ratio of movement of the element; means connecting the opposite end of the pulley-carrying member to the hydraulic power unit for effecting movement of the reciprocating member in response to adjustment of the hydraulic unit; and pulley means positioned on the main frame to cause the cable to operate to raise or lower the main frame upon movement of the reciprocating member.

References Cited in the file of this patent

UNITED STATES PATENTS

| | | |
|---|---|---|
| 2,618,214 | Ball | Nov. 18, 1952 |
| 2,621,942 | Getz | Dec. 16, 1952 |
| 2,625,089 | Pursche | Jan. 13, 1953 |
| 2,651,983 | Weast | Sept. 15, 1953 |
| 2,793,774 | Lovegreen | May 28, 1957 |
| 2,817,537 | Atkinson | Dec. 24, 1957 |
| 2,827,187 | Elmore | Mar. 18, 1958 |